United States Patent [19]
Fournier et al.

[11] 4,387,937
[45] Jun. 14, 1983

[54] BEARING ASSEMBLY FOR ROTOR CENTERING DEVICE

[75] Inventors: Jean-Pierre Fournier, Ecos; Jacques Cabillic, Gaillon, both of France

[73] Assignee: Societe Europeenne de Propulsion, Puteaux, France

[21] Appl. No.: 233,905

[22] Filed: Feb. 12, 1981

[30] Foreign Application Priority Data

Feb. 19, 1980 [FR] France ............................ 80 03624

[51] Int. Cl.³ .................... F16C 21/00; F16C 39/02
[52] U.S. Cl. .......................... 340/682; 308/184 R; 308/189 R; 308/1 A
[58] Field of Search ............... 308/1 A, 35, 184 R, 308/184 A, 178, 189 R, DIG. 15

[56] References Cited

U.S. PATENT DOCUMENTS

| | | | |
|---|---|---|---|
| 2,352,911 | 7/1944 | Osplack | 308/35 |
| 2,782,079 | 2/1957 | Kachnik | 308/35 X |
| 3,147,048 | 9/1964 | Johnson et al. | 308/184 R X |
| 3,759,588 | 9/1973 | Anderson | 308/35 |
| 4,019,792 | 4/1977 | Monroe . | |

FOREIGN PATENT DOCUMENTS

| | | |
|---|---|---|
| 924665 | 3/1955 | Fed. Rep. of Germany . |
| 1947043 | 3/1971 | Fed. Rep. of Germany . |
| 2807411 | 8/1978 | Fed. Rep. of Germany ... 308/184 R |
| 2716433 | 10/1978 | Fed. Rep. of Germany . |
| 2803474 | 8/1979 | Fed. Rep. of Germany . |
| 1174807 | 11/1958 | France .............................. 308/178 |
| 2126511 | 10/1972 | France . |
| 462519 | 3/1937 | United Kingdom ........... 308/189 R |

*Primary Examiner*—Robert S. Ward, Jr.
*Attorney, Agent, or Firm*—Bachman and LaPointe

[57] ABSTRACT

A rotor centering device comprising two radial bearings each one constituted of first and second opposing members with angular contact races, mounted with axial clearance so that if one of the said members is in abutment, the other member has a radial clearance. The first angular contact centering members of the first and second bearings are also opposing, and the second angular contact centering members of the first and second bearings are likewise opposing, so that by relative axial movement of the inner and outer contact races of both first and second centering means belonging to the two bearings, simultaneous contact of the inner and outer faces is achieved either with the first centering members or with the second centering members which happen to be opposing on the two bearings.

11 Claims, 12 Drawing Figures

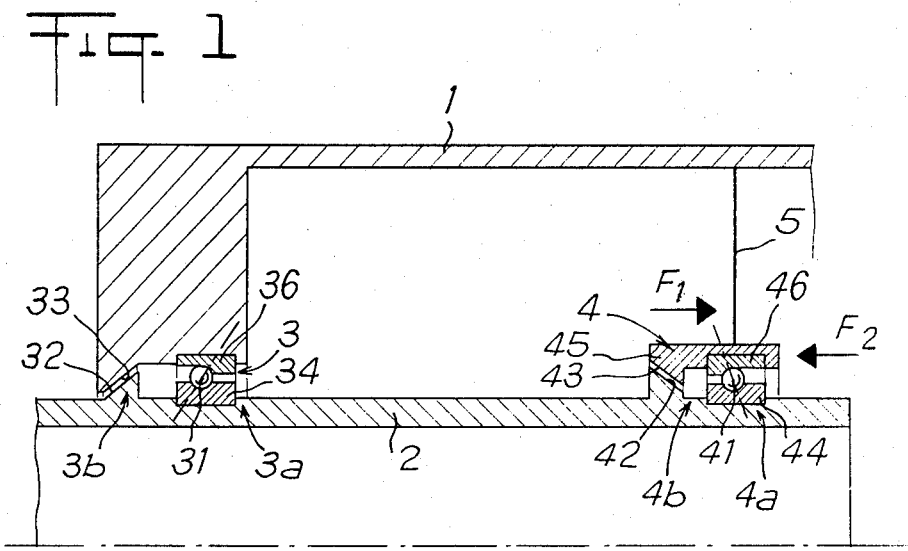
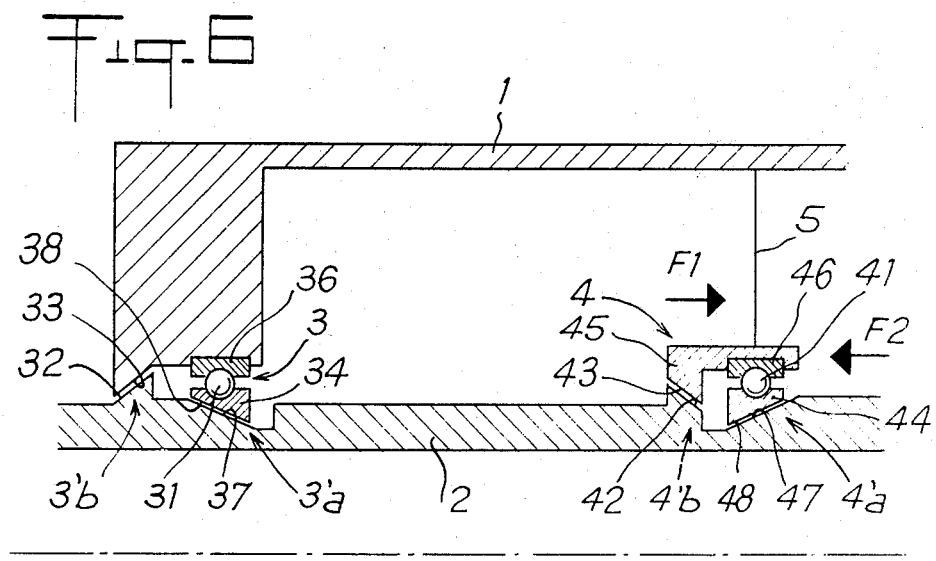

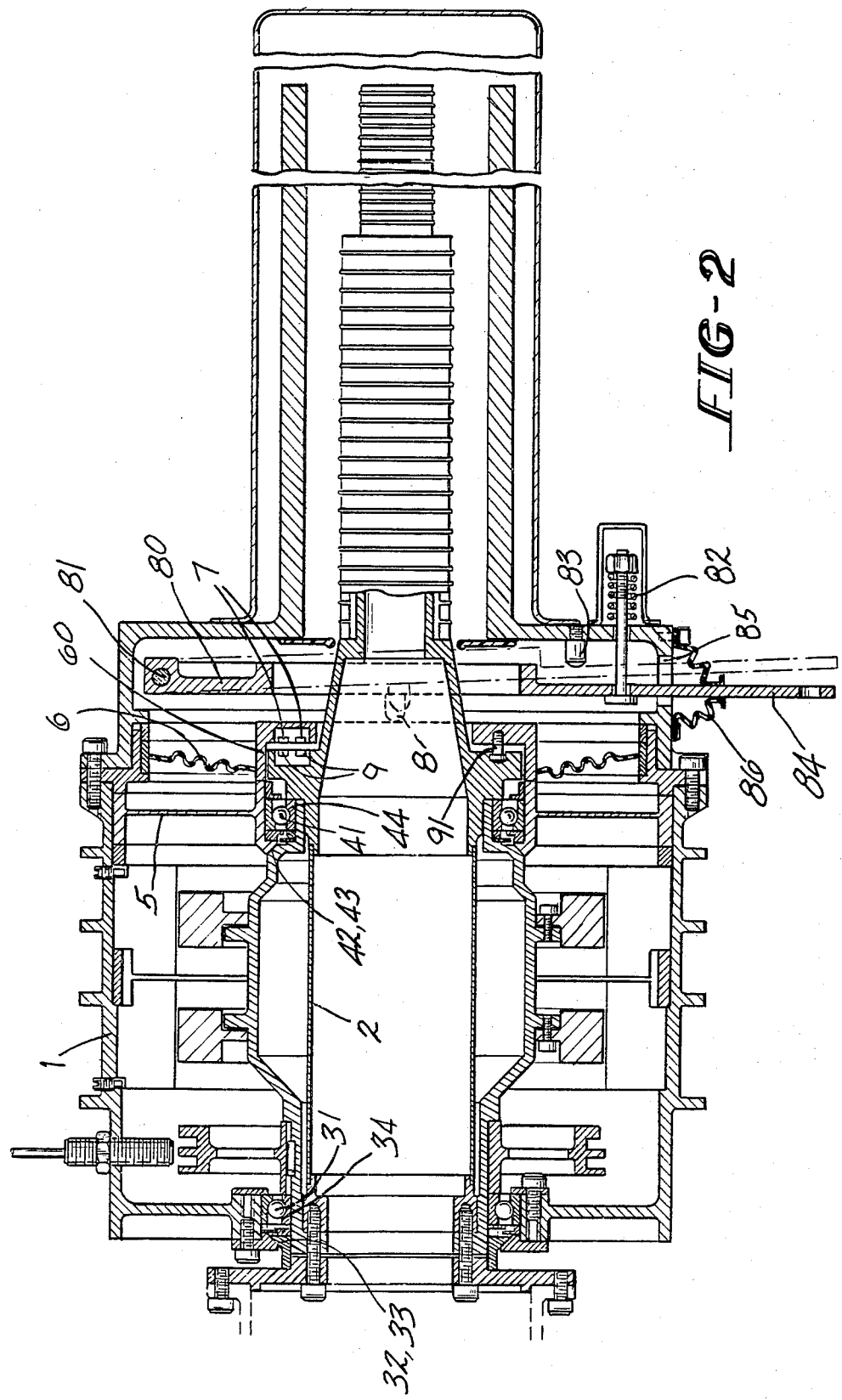

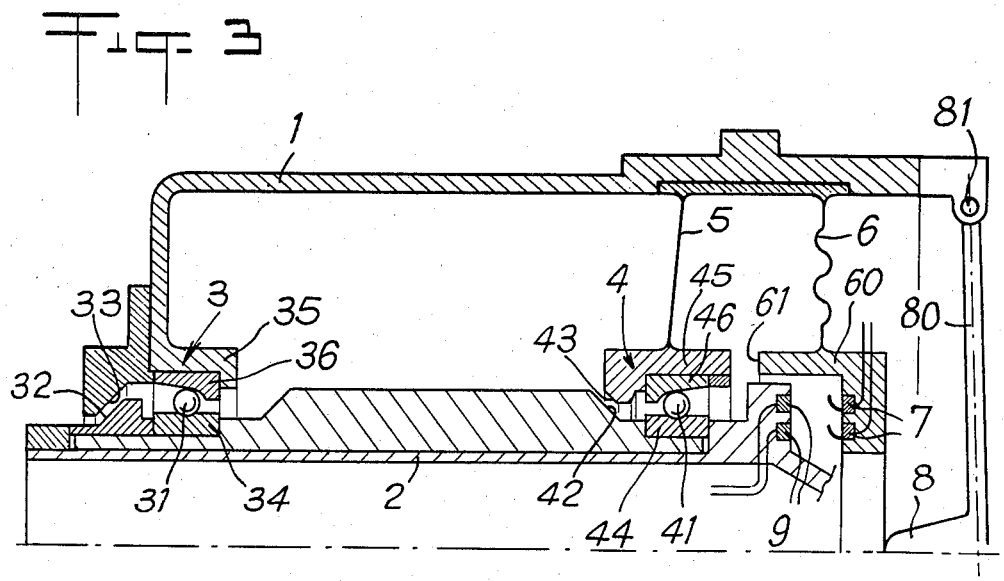
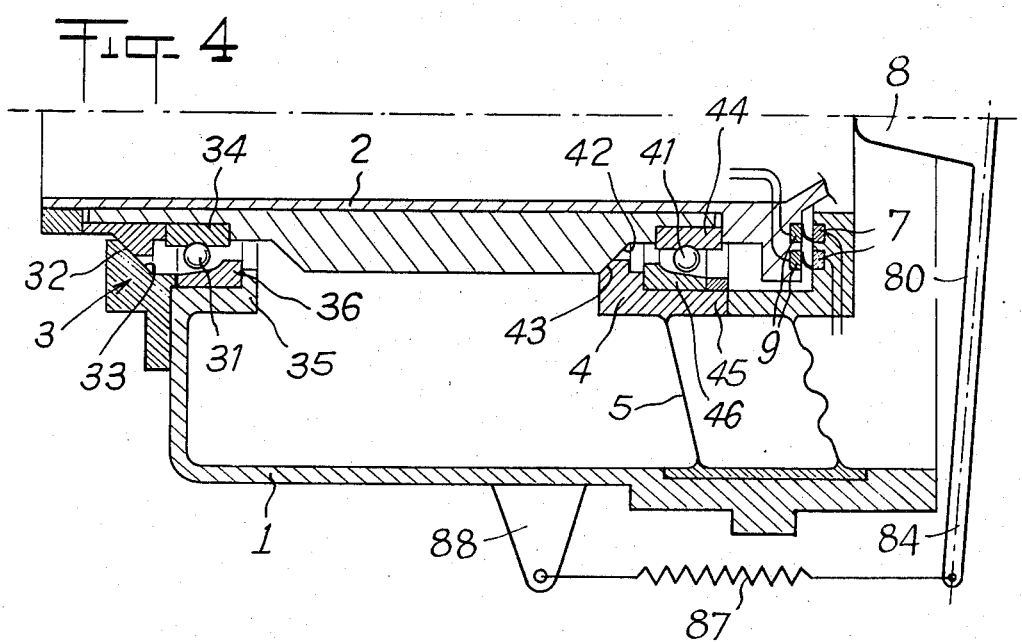

BEARING ASSEMBLY FOR ROTOR CENTERING DEVICE

BACKGROUND OF THE INVENTION

The present invention relates to a centering device for two elements rotating one with respect to the other, comprising at least first and second radial bearings situated at a distance one from the other along the axis of the rotor and each one being constituted of first and second opposing centering members with angular contact between inner and outer races.

A large number of mechanisms equipped with bearing assemblies such as ball bearings or needle bearings are designed to operate in a calm environment without vibrations. But, generally, such mechanisms are often subjected during phases where they are not working, and in particular during a transport, to vibrations and to strong shocks. It is well known that bearings are very responsive to shocks and to vibrations, especially when there is no rotation of the rotor supported by the bearings. It is precisely the object of the present invention to propose devices which permit to isolate the bearings from external vibrations during their rest period, or which permit to guarantee a reliable operation both in a first phase of transitory operation of limited duration corresponding to severe conditions of environment and in a second phase of operation demanding great accuracy.

Such systems whereby a rotor can be locked in a rest position or if necessary kept rotating whilst relieving the main bearings from the effort of supporting the rotor, are particularly useful in the space domain where mechanisms are subjected to a vibratory phase during launching and are thereafter required to operate in space, without any breakdowns, i.e. without vibrations especially. Of course many other applications are known on land, for example, the assembling of precision mechanisms such as transportable optical devices or aerial directing systems.

An example of a known device for locking a rotor and partly unloading bearing assemblies comprises a rotor mounted in a frame by means of a first bearing means constituted by a first bearing assembly with angular contact and a second bearing means constituted by a second bearing assembly of the angular contact type, i.e. with bearing ball contacts forming with a radial plane of the rotor, a certain predetermined angle of contact.

In his case, complementary conical portions are formed on parts which respectively support the rings of the first bearing assembly. When the rotor is not in operation, an axial force is applied on said rotor in order to bring the conical portion of the rotor on the conical portion of the stator, so that the rolling elements of the first bearing assembly are entirely unloaded. Such a system however does not ensure any reduction of the loading force exerted on the rolling elements of the second bearing assembly by the rotor and therefore it does not allow for complete unloading of the bearing assemblies.

Assemblies are also known which comprise radial bearings each one comprising at least first and second, opposing angular contact bearing assemblies, i.e. bearing assemblies adapted to exert axially opposed forces. Such types of bearing assemblies are not however unloadable and therefore cannot permit the locking of a rotor in a rest position in such a way as to ensure that the bearing assemblies are well preserved.

It is the object of the invention to overcome the drawbacks of the prior devices and to procure an assembly whereby when a rotor is not in operation, it is safely locked in position and all the different rolling elements of the main bearing assemblies used are completely unloaded, thus reducing the risks of damages to them through shocks or vibrations to which the whole device assembly could be subjected.

A further object of the invention is to allow the use of a rotor for transmitting signals, when the rotor is in the locked position according to the assembly of the present invention.

SUMMARY OF THE INVENTION

The foregoing objects are attained with a centering device of the type mentioned hereinabove, wherein for each radial bearing the first and second opposing centering members with angular contact between inner and outer races, adapted to exert by their opposing opposite forces along the rotation axis, are mounted with axial clearance so that when one of said members is in abutment, the other member has a radial clearance and reciprocally the first angular contact centering members of the first and second bearings are also opposing, and the second angular contact centering members of the first and second bearings are likewise opposing, so that by relative axial movement of the inner and outer contact races of both first and second centering means belonging to the two bearings, simultaneous contact of the inner and outer races is achieved either with the first centering members or with the second centering members which happen to be opposing on the two bearings, thereby transferring all the load either on the first centering members or on the second centering members.

Preferably, for each bearing, the inner contact races of the first and second opposing centering members are integral with a single inner ring and the outer contact races of the first and second opposing centering members are also integral with a single outer ring, the relative axial movement for each bearing of the inner and outer ring permitting either of the centering members to become carrier.

According to a first embodiment, the first centering members of the first and second bearings are of the unloadable ball bearing type with angular contact.

According to another embodiment, the first centering members of the first and second bearings are of the undismountable ball or roller type. Said first centering members are each provided with an extra conical centering race integral with the rotor and cooperating with a corresponding conical race formed on a ring element used for retaining the balls or rollers to ensure a radial clearance between the extra conical centering race and the corresponding conical race of the ring element when the races of the second centering members are contacting, said extra conical centering race and corresponding conical race constituting said inner and outer races of the first centering members.

Advantageously, the second centering members are of the cone-over-cone contact type.

According to a special characteristic of the present invention, a deformable membrane exerts a pre-stress and a centering action on at least one displaceable ring connected to the frame, associated to the second bearing in order to ensure a centering of the rotor on the first centering elements.

An actuating mechanism is provided in order to exert, in the centering position on the two centering elements, an axial force on the said displaceable ring of the second bearing in the opposite direction to the force exerted by the prestressing membrane in order to successively bring into contact the angular contact races of the second centering element of the second bearing, and then the angular contact races of the second centering member of the first bearing, relieving simultaneously the first centering members from the supporting stresses of the rotor.

According to a variant embodiment of the invention, the centering device comprises stator contacts mounted on a part made fast with the frame via a deformable flexible membrane, the said stator contacts are arranged opposite rotor contacts, at a short distance thereof and the actuating mechanism, whenever controlled to place the races of the second centering members in contact, also brings into contact the stator contacts and the rotor contacts, thereby ensuring via the rotor a transmission of the electric signals when the rotor is in the locked position.

In this case, the actuating mechanism, whenever controlled, acts first on the part bearing the stator contacts which is situated in the vicinity of the first centering member of the second bearing and which acts on the ring of the second bearing, which ring is connected to the frame to ensure the unloading of the ball bearing elements at the same moment when contact is made between the stator contacts and the rotor contacts.

BRIEF DESCRIPTION OF THE DRAWINGS

The invention will be more readily understood on reading the following description with reference to the accompanying drawings in which:

FIG. 1 is a diagrammatical view showing the principle of an assembly according to the invention, FIG. 2 is an axial cross-section of a locking device according to the invention adapted to an example of rotating machine, FIGS. 3 and 4 diagrammatically illustrate the locking device according to the invention in the rest position and in the actuated position respectively.

FIG. 6 is a detailed view of a variant embodiment showing the application of the invention to rotor suspensions using undismountable bearings.

DETAILED DESCRIPTION

Figure 5A:
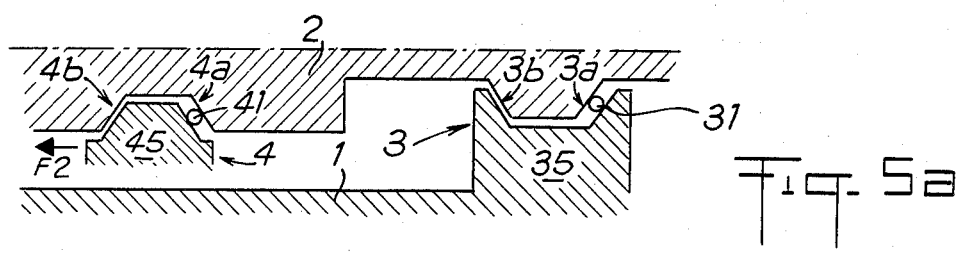
FIGS. 5a to 5g diagrammatically illustrate several variants of embodiment of bearings coming within the scope of protection of the invention.

FIG. 1 shows an assembly in which a rotor 2 is mounted by way of bearings 3, 4 with ball bearing elements in a frame 1. The bearings 3 and 4 each comprise a first centering member 3a, 4a, provided with inner and outer rings 34, 36; 44, 46 and rolling elements 31, 41 interposed between each pair of rings.

Complementary conical parts 32, 33 are formed on the side of the first bearing assembly on the one hand on the rotor 2 and on the other hand on a part supporting the ring 36, integral with the frame 1, and constitute a second centering member 3b for the bearing 3. When the rotor is moved axially, the conical part 32 can come to bear on the conical part 33 thus unloading the balls 31 of the first bearing assembly. In the case of the assembly shown in FIG. 1, the bearing balls 41 of the second bearing assembly 4a are also unloaded when the rotor is in the rest position. To do so, the ball ring 46 connected to the frame 1 is supported by a part 45 integral with a prestressing membrane 5. A conical race 43 is formed on the part 45 whereas a corresponding and complementary race 42 is formed at a short distance from the race 43, on the rotor 2 to constitute a second centering member 4b for the bearing 4. Moreover, the bearing unloading force is exerted, not directly on the rotor 2, but first, according to arrow $F_2$, on the part 45 which, after having unloaded the bearing balls 41, comes to bear against the conical part 42 of the rotor 2 and permits, by a transfer of the unloading force $F_2$ to unload the bearing elements 31 of the first bearing assembly.

FIGS. 2 to 4 show a locking device according to the invention applied to a rotary electric machine. The FIGS. 2 and 4 show the locking device in the actuated position, i.e. in a position where the rotor is not turning and is locked in position by cone-over-cone contacts of the conical races, formed on the rotor and on the stator, whereas FIG. 3 shows the rotor in a working position, the locking device not being actuated. The example of embodiment described in reference to FIGS. 2 and 4 ensures the passage of electric signals through the rotor whilst the latter is locked. This variant embodiment can be applied for example to a driving mechanism for a satellite solar generator. The rotor in the locked position can then be used to transmit unfolding order to the solar panels.

The locking mechanism seen in FIG. 2 comprises a lever 80 pivoting about a point 81 fixed on the frame 1 of the machine. Said lever 80 is returned to the rest position by a spring 82 and can be moved against the action exerted by said spring, by means of an external actuating member 87 whose point of action is situated at the end 84 of the lever opposite the pivoting point 81 and emerging from the housing 1 of the machine. The stroke of the lever 80 is limited by the opening 85 provided in said housing 1 and cooperates with a bellowed sealing membrane 86 placed on the outside of the opening 85. The lever 80 carries a pressing stem or stud 8 which acts on a part 60 constituting a stator element. The part 60 is itself mounted on a flexible membrane 6 joined to the frame 1 which ensures a centering of the part. Electrical contacts 7 are provided on one face of the part 60 which is perpendicular to the axis of the rotor and situated opposite one face of the rotor which is likewise provided with electrical contacts 9. A lug 91 permits to position the stator part 60 with respect to the rotor 2 in a predetermined angular position in order to ensure a direct connection of the contacts 7 and 9. But other means of correction or angular positioning can also be used such as for example conical races 42, 43 with a positioning facing.

The functioning of the locking mechanism shown in FIGS. 2 to 4 will be explained with reference to FIG. 3 wherein the rotor 2 is shown to be mounted normally on the first centering members 3a and 4a and the locking mechanism is entirely disconnected.

The pusher 8 which is actuated from the pivoting lever mechanism 80 comes first into contact with the rear face of the part 60 which moves axially towards the left (FIG. 3) so that the front face 61 of the part 60 comes, in turn, against the part 45 supporting the ball-ring 46 and, by a common movement of the parts 45 and 60 against the action of the deformable membranes 5 and 6, causes the contact between the complementary conical parts 42 and 43 of the rotor 2 and of the part 45, as well as the electrical junction between the stator contacts 7 and the rotor contacts 9. At this stage, the bearing assembly 4a is partly dismantled and the membrane 5 can no longer exert a prestressing force on the ball-ring 46 so that the bearing balls 41 are free.

The stroke of the pusher 8 is continued axially towards the left to reach the position shown in FIG. 4 wherein the whole rotor assembly 2 has moved with the parts 60 and 45 following the deformation of the membranes 5 and 6 to bring the conical parts 32 formed on the rotor 2 adjacent the first bearing assembly 3 in contact with the conical parts 33 formed on the part 35 supporting the bearing ring 36. So that, the first bearing assembly 3a is also partly dismantled and the bearing balls 31 are free with limited possibilities of movement which prevent the transmission of the vibrations with no damages to the bearing balls or to the roller paths during the unloading action due to the fact that the shocks produced by the very small authorized movements of the bearing balls are limited. Locking means 88 for the actuating lever 80, permit keeping the rotor 2 in a locked position throughout the rest period, for example, throughout the launching of a satellite or the transport of the machine. At the end of this transitory phase of limited duration the locking means 88 can if necessary be definitely disconnected, thus permitting to the rotor to return automatically to the working position by drawing back the lever 80 through the spring 82.

According to an example of embodiment, the full stroke of the pusher 8 is 3.6 mm, the stroke of the stator piece 60 is 2.6 mm, the stroke of the part 45 supporting the ball-ring 46, and as a result the axial deformation of the prestressing membrane 5 is 0.6 mm, whereas the axial stroke of the rotor 2 is 0.3 mm. The relative movement rotor 1-stator 60 is thus 2.3 mm. When the bearing balls 31, 41 are unloaded, the possibilities of maximum movement of these bearing balls are of the order of 0.1 mm.

Generally speaking, the stroke of the pusher 8 is advantageously between 2 and 6 mm, the axial distance between two complementary conical parts 32, 33; 42, 43 is advantageously between 0.2 and 0.5 mm and the axial deflection of a prestressing membrane is advantageously between 0.5 and 1 mm.

Of course, other means can be used for actuating the pusher 8 besides the aforedescribed lever system, for example pneumatic or hydraulic means. The invention is not either limited to machines in which the external rings of the bearing assemblies are connected to the stator, and it can also be applied to machines whose external rotor is mounted on an internal fixed shaft.

The examples described in reference to FIGS. 1 to 4 shows ball bearing type elements. Roller bearing types of elements can also be used for certain applications. The first centering members 3a and 4a can also in some cases be constituted by plain bearings, or the centering members 3b, 4b by ball bearings. There is then a redundancy whereby, during a first transitory phase of limited duration, a rotor is capable of rotating on first centering members 3a, 4a, in severe ambient conditions, the other centering members 3b, 4b remaining unloaded, and of transferring the support of the rotor on the centering members 3b, 4b at the end of the transitory period to ensure accurate functioning in a calm environment, even though the first centering members 3a and 4a may have suffered damages during the transitory period.

In all cases, it is necessary for the first and second centering members 3a, 3b or 4a 4b of the same bearing assembly 3 or 4 to be opposing, when the first centering members 3a, 4a themselves are opposing as well as the second centering members 3b, 4b. This condition can be achieved with various configurations such as can be seen in FIGS. 5a to 5g, which give simplified representations of special embodiments of the invention.

FIG. 5a shows that the opposing of the forces exerted along the axis of the rotor at the level of the different contact races of the centering members 3a, 3b, 4a, 4b has been respected, although the configuration of the bearing assemblies 3 and 4 is assymmetrical. For example, in the bearing 3, the contact races related to the rotor 2 are formed on essentially convex faces whereas in the bearing 4, the contact races related to the rotor 2 are formed on essentially concave faces, the ball bearing centering members 3a, 4a being alternated with the conically faced centering members 3b, 4b along the axis of the rotor.

Figure 5B:
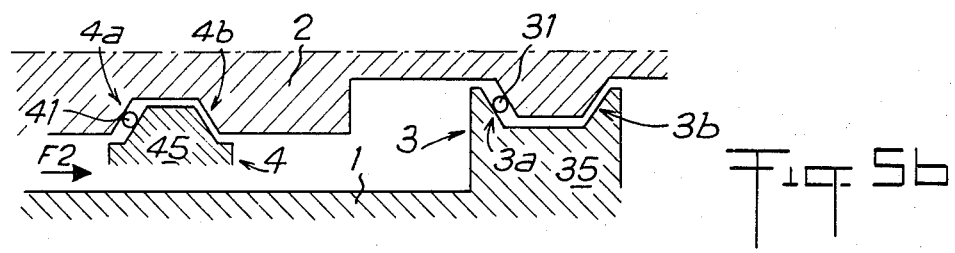

FIG. 5b is similar to FIG. 5a, but the alternated arrangement of the ball-bearing members 3a, 4a and of the conical face members 3b, 4b is reversed, the ball bearing elements 41 of the member 4a related to the bearing 4 whose ring 45 related to the stator is movable, being situated on the side of an end of the rotor 2.

Figure 5C:
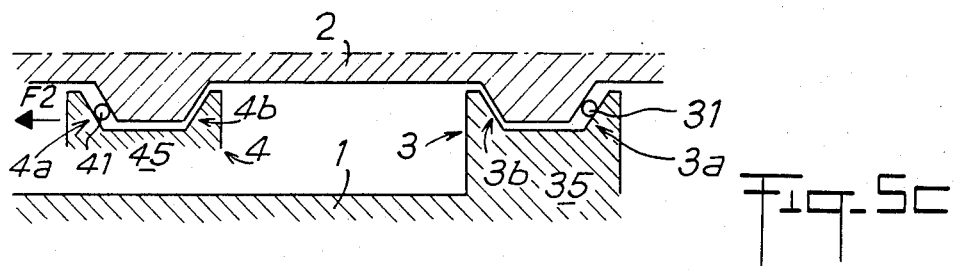
Figure 5D:
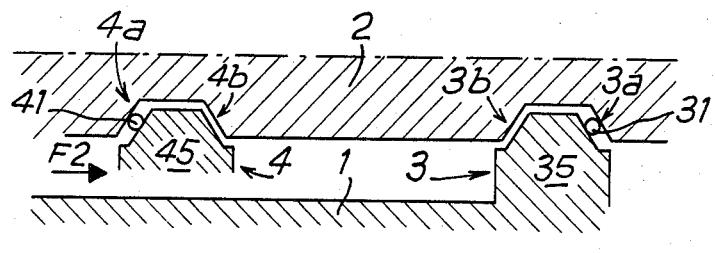

FIGS. 5c and 5d illustrate embodiments in which the ball-bearing centering members 3a, 4a are shifted towards the outside, on the side of the rotor ends and ensure a good tightness for the suspension in the working position on these ball-bearing centering members. FIG. 5c shows contact races related to the rotor which are all formed on essentially convex faces whereas the contact races related to the rotor in FIG. 5d are formed on essentially concave faces.

Figure 5E:
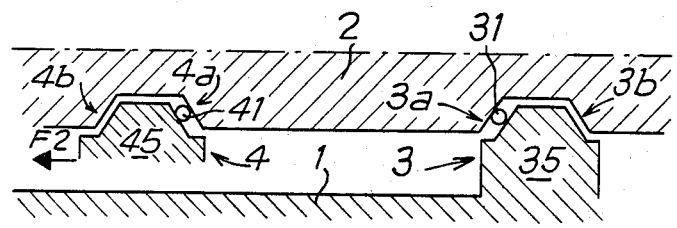
Figure 5F:
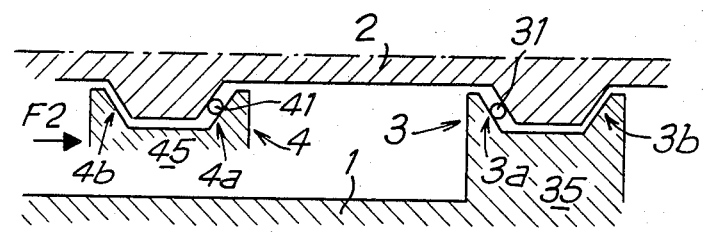

FIGS. 5e and 5f correspond to embodiments in which the conical race centering members 3b, 4b are situated on the side of the ends of the rotor 2 thereby ensuring a good tightness when the rotor is suspended on said centering members 3b, 4b. The configuration of the contact races related to the rotor for FIGS. 5e and 5f is respectively similar to that of FIGS. 5d and 5c.

Figure 5G:
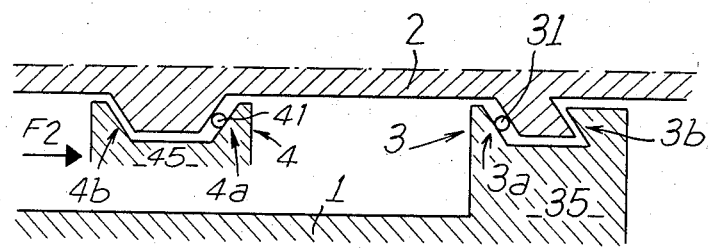

FIG. 5g shows an embodiment equivalent to that shown in FIG. 5f the member 3b having simply changed orientation. It can be observed that the centering member 3b of FIG. 5g remains opposing with the centering member 3a on the one hand and the centering member 4b on the other hand, seeing that the forces which the member 3b on the one hand and the members 3a, 4b, on the other, are capable of exerting on the rotor 2 are respectively opposed according to their axial component.

In the foregoing examples, it has been considered that the external force exerted in order to place the rotor from the position in suspension on the centering members 3a, 4a (as shown in FIGS. 5a to 5g to the position in suspension on the centering members 3b, 4b was obtained by acting in the direction of arrow $F_2$ on the ring 45 of the bearing 4, which transmitted a lateral force in the same direction on the rotor 2 to unload the bearing 3. According to a variant, the rotor cannot sustain any translation along its axis, and a squeezing force can be exerted axially both on the ball-ring 45 related to the stator and on the ball-ring 35 which must then be joined to the stator via a prestressing element. The force exerted on the ball-ring 35 is then of the same but opposite direction as the force $F_2$.

Various modifications may of course be brought to the description of the invention given hereinabove.

For example, resilient means such as springs can be used instead of the prestressing membranes 5, 6.

Also, as can be seen in FIG. 6, it is possible to use non-dismountable roller bearings 3'a 4'a.

FIG. 6 shows a special embodiment of the invention very similar to that shown in FIG. 1 permitting to unload the bearing balls 31, 41 of the bearing assemblies 3'a and 4'a whenever an axial movement in the direction of arrow $F_2$ has allowed the bringing in contact of the races 32 and 33 of the centering member 3'b and of the races 42 and 43 of the centering member 4'b. In the case of FIG. 6, the bearing balls or rollers 31, 41 of the bearing assemblies 3'a, 4'a being inserted in non-dismountable manner between the ball-rings 34, 36 and 44, 46 respectively, the whole assembly of the parts 34, 31, 36 and 44, 41, 46 remains in one piece with the frame 1. But then each centering member 3'a, 4'a comprises an extra conical centering race 37, 47 respectively, which cooperates with the ring element 34, 44 respectively, itself being provided with a corresponding conical race 38, 48. Thus a radial clearance is created between the races 37, 38 on the one hand and between the races 47 and 48 on the other hand so that the ball-bearing elements 31 and 41 are unloaded. When no action is exerted in the direction of arrow $F_2$, then the centering members 3'b, 4'b are unloaded, as in the preceding embodiments and the radial clearance between the races 37 and 38 and 47 and 48 disappears so that the bearing assemblies 3'a, 4'a can play their traditional part which is to support the rotating rotor.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. Centering device for two elements rotating one with respect to the other, comprising first and second radial bearings, both situated at a distance from one another along the axis of the rotor and each constituted by first and second opposing centering members with angular contact between inner and outer faces, device wherein for each radial bearing the first and second opposing centering members with angular contact between inner and outer races, adapted to exert by their opposing opposite forces along the rotation axis, are mounted with axial clearance so that when one of said members is in abutment, the other member has a radial clearance and reciprocally the first angular contact centering members of the first and second bearings are also opposing, and the second angular contact centering members of the first and second bearings are likewise opposing, so that by relative axial movement of the inner and outer contact races of both first and second centering means belonging to the two bearings, simultaneous contact of the inner and outer races is achieved either with the first centering members or with the second centering members which happen to be opposing on the two bearings, thereby transferring all the load either on the first centering members or on the second centering members.

2. Centering device as claimed in claim 1, wherein for each bearing, the inner contact races of the first and second opposing centering members are integral with a single inner ring and the outer contact races of the first and second opposing centering members are also integral with a single outer ring, the relative axial movement for each bearing of the inner and outer rings permitting either of the centering members to become the carrier.

3. Centering device as claimed in claim 2, wherein the first centering members of the first and second bearings are of the unloadable ball bearing type with angular contact.

4. Centering device as claimed in claim 2, wherein the first centering members of the first and second bearings are of the undismountable ball or roller bearing type; said first centering members are each provided with an extra conical centering race integral with the rotor and cooperating with a corresponding conical race formed on a ring element used for retaining the balls or rollers to ensure a radial clearance between the extra conical centering race and the corresponding conical race of the ring element when the races of the second centering members are contacting, said extra conical centering race and corresponding conical race constituting said inner and outer races of the first centering members.

5. Centering device as claimed in claim 2, wherein the second centering members are of the cone-over-cone contact type.

6. Centering device as claimed in claim 2, wherein a deformable membrane exerts a pre-stress and a centering action on at least one displaceable ring connected to the frame, associated to the second bearing in order to ensure a centering of the rotor on the first centering elements.

7. Centering device as claimed in claim 6, wherein an actuating mechanism is provided in order to exert, in the centering position on the two centering elements, an axial force on the said displaceable ring of the second bearing in the opposite direction to the force exerted by the prestressing membrane in order to successively bring into contact the angular contact races of the second centering element of the second bearing, and then the angular contact races of the second centering member of the first bearing, relieving simultaneously the first centering members from the supporting stresses of the rotor.

8. Centering device as claimed in claim 7, wherein the said actuating mechanism comprises a pushing stem mounted on a lever pivoting on the frame, controlled from the outside of said frame and return to the rest position by means of a spring.

9. Centering device as claimed in claim 8, wherein the locking means are associated to the actuating mechanism for holding the rotor in the working position.

10. Centering device as claimed in claim 1, wherein said device comprises stator contacts mounted on a part made fast with the frame via a deformable flexible membrane, the said stator contacts are arranged opposite rotor contacts, at a short distance thereof and the actuating mechanism, whenever controlled to place the races of the second centering members in contact, also brings into contact the stator contacts and the rotor contacts, thereby ensuring via the rotor a transmission of the electric signals when the rotor is in the locked position.

11. Centering device as claimed in claim 10, wherein the actuating mechanism, whenever controlled, acts first on the part bearing the stator contacts which is situated in the vicinity of the first centering member of the second bearing and which acts on the ring of the second bearing, which ring is connected on the frame to ensure the unloading of the ball bearing elements at the same moment when contact is made between the stator contacts and the rotor contacts.

* * * * *